Feb. 5, 1957  G. H. KINS  2,779,972
PRESSURE VESSEL
Filed Sept. 9, 1953  3 Sheets-Sheet 1

INVENTOR:
GEORG H. KINS
By A. John Michel
Attorney

United States Patent Office 2,779,972
Patented Feb. 5, 1957

2,779,972

PRESSURE VESSEL

Georg Heinrich Kins, Hainstadt (Main), Kreis Offenbach, Germany

Application September 9, 1953, Serial No. 379,272

Claims priority, application Germany September 10, 1952

9 Claims. (Cl. 18—30)

This invention relates to a device for heating poor heat-conductive materials while flowing and is especially intended for use in fusing or liquefying organic materials for injection molding.

The main object of the invention is to provide a device by means of which material of the aforesaid kind can be transformed, by the application of heat, into such liquid or semiliquid condition that it can be injection-molded.

Organic materials adapted to be used for the purposes of the invention may be, for example, the polymeric vinyl compounds, particularly such consisting of vinyl chloride, vinyl propionate, vinyl carbazol, polyamide, styrene, acrylic acid ester, metaacrylic acid ester and similar compounds, as also mixtures of such materials and mixed polymerisates and other synthetic or natural materials such as may be found suitable for die-casting, injection molding or the like, such as cellulose esters and ethers, for instance.

Another object of the invention resides in heating the device by means of a heating agent, preferably from the outside, in such a manner that the admitted heat will be conducted with the best possible efficiency from the inner walls of the device to the material passing therethrough, and to effect an even distribution of the heat thereto.

A further object of the invention is to increase the efficiency of injection molding susbtantially by making the inner heating surfaces of a suitable heating vessel as large, and the thickness of the flowing stream of the of the material as thin as possible, which will enable a good transfer of the heat from the walls of the vessel so that large quantities of material can be liquefied within relatively very small periods of time.

In pressure vessels of the kind just referred to and which are provided with internal ribs or fins projecting from the inner walls of the vessels into the interior thereof, a still further object of the invention is the provision of means producing, with a thin stream of flowing material and with a good transfer of the heat, excellent flowing conditions in the pressure vessel, especially in the region in which the flowing masses change from a substantially solid into a liquid state, blocking of the material being prevented and a thorough agitation of the flowing substances being obtained.

With these and other objects in view, the invention provides ribs or fins which project from the inner wall of the pressure vessel into its interior and which are interrupted in the direction of the flow of the material. The interruptions, in accordance with the invention, may extend only partly into the ribs or fins in the shape of recesses, or they may completely subdivide the ribs or fins into a number of hump-like projections. In the latter case, it has been found of advantage to arrange the humps, which extend in the direction of the flow of the material, to be set off laterally from one another.

Other features and advantages of the invention will be apparent from the now following description of the accompanying drawings, which illustrate several embodiments of the invention by way of example, and in which Fig. 1 is a longitudinal section through a pressure vessel with partly interrupted ribs or fins, Fig. 2 is a longitudinal section through another part of the vessel on line II—II of Fig. 1, Fig. 3 represents a cross section through the vessel on line III—III of Fig. 1.

Figure 1:
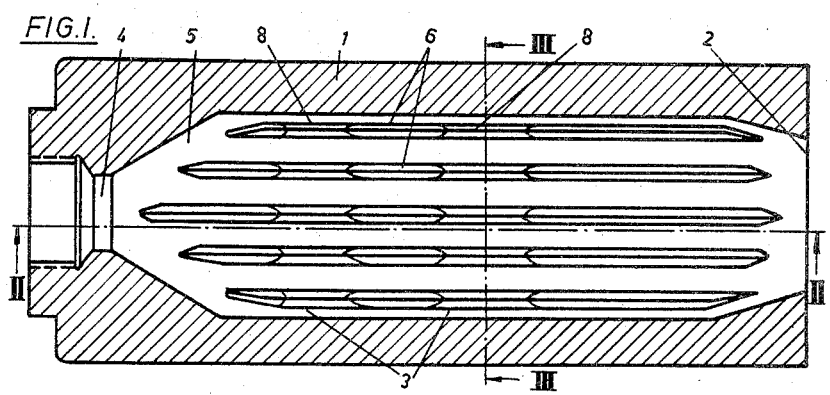
Figure 2:
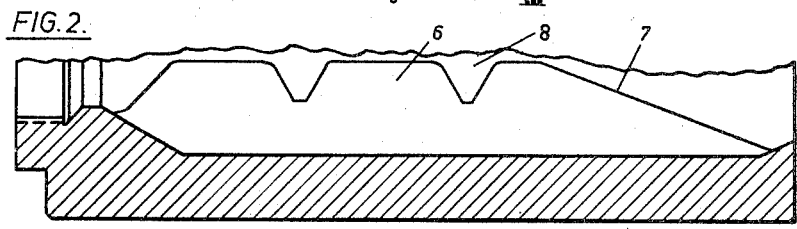
Figure 3:
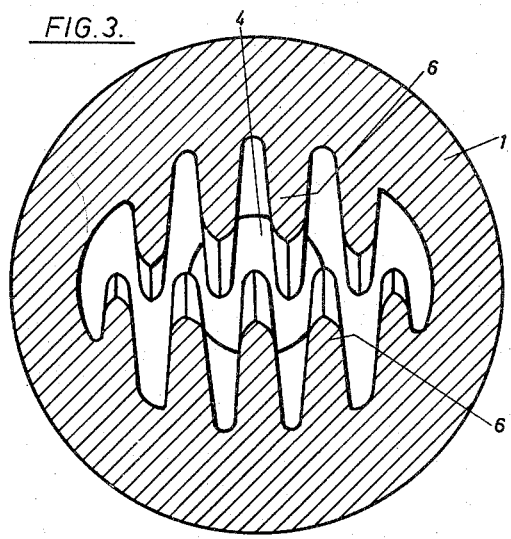

The pressure vessel shown in Figs. 1 to 3 consists of a cylindrical shell or case 1 which is provided with an inlet opening 2 to receive the material to be heated during its passage through the vessel. The entrance opening 2 is flared into the central chamber 3 which, at its other end, is conically reduced so as to form a nozzle-shaped outlet opening 4 for the discharge of the wholly or partly liquefied material from the vessel. As illustrated in Fig. 3, the hollow chamber 5 is of substantially elliptical cross section but it may be of any other cross sectional shape, as for instance square, oblong, rectangular, or the like. Arranged on the inner wall of the shell or casing are two mutually opposing groups of ribs or fins, which extend to the center line of the vessel, or a little beyond. In this way the fins are distributed over the entire chamber and thus divide the flowing mass into layers of a definite thickness. As is shown in Fig. 2, the fins 6 have an inclination 7 starting from the entrance side of the vessel and rising up to their ultimate height, in which they may continue along a straight line at a given level. They may also follow a definite curve or rise in a steplike or other formation. It is preferable, although not absolutely necessary, to make the said inclinations so that they will stretch over approximately a third of the length of the vessel. The interruptions of the fins in the example just described are only partial. They consist of the recesses 8 in the central part of the casing in which, especially with the employment of the vessel for fusing synthetic materials, the transformation takes place from the solid into the liquid state of the material. The recesses 8, which extend only through a part of the height of the fins, enable a favourable flow of the molten material and thereby assist in the prevention of congestions particularly in the region in which the aggregate changes take place.

In the modified arrangements which are illustrated in Figs. 4 to 7, the interruptions are complete in that they extend right down to the foot of the fins, which are thus divided up into separate hump-like projections 9 which, besides, are set off in relation to each other in the direction of the flow of the passing mass. By this arrangement of the ribs or fins, the current of the passing mass is diverted after each laterally adjacent group of humps, so that always those portions of the mass which were in direct contact with the humps of one group would now pass into the space between the humps of the next group, while successively in the next group of humps, through which the mass is pressed, another diversion of the stream takes place, in which the previously inside regions now come outside again and into contact with the walls of the humps. This arrangement enables all portions of the mass during its passage through the vessel to come into intimate contact with the heating fins, so that a quick and thorough transfer of the heat is obtained. Besides, the moving mass is vigorously agitated by these repeated diversions which also acts in the sense of a good heat conduction.

Another advantage accruing from the aforesaid results, namely the obtainment of quantity production, resides in the fact that the vessel may be made considerably smaller without the quantity delivered in unit time becoming reduced. Also in this case the humps 9 may be provided at the entrance side of the vessel with gradual inclinations 7' while those more in the center of the vessel are of a steeper ascent.

Figure 6:
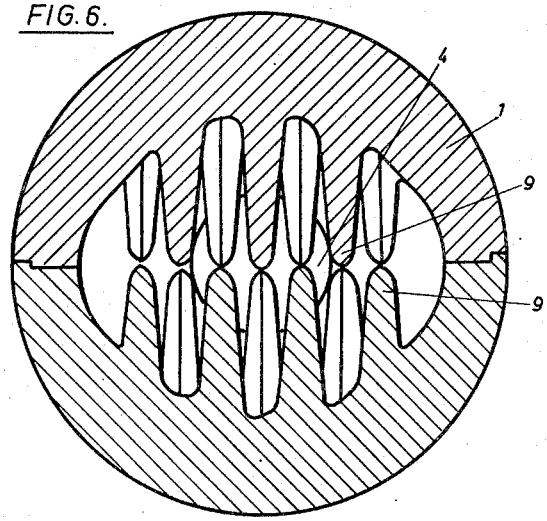
Fig. 6 is a cross section through the vessel taken on line VI—VI of Fig. 4.

To facilitate production, the pressure vessel may be divided into two parts, as illustrated in Fig. 6, for example in the symmetric plane which passes through the device approximately at the level of the upper edges of the humps. The two sections may be united in any desired manner not shown in the drawings.

Figure 4:
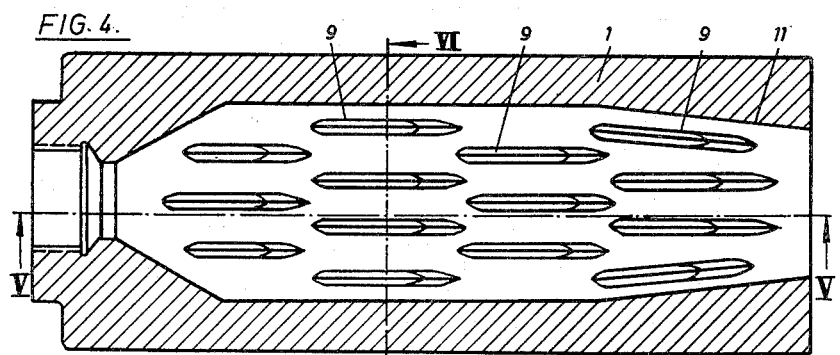
Fig. 4 illustrates a longitudinal section through another modification of a pressure vessel in which the internal ribs or fins are arranged in the shape of mutually set off humps.

It is also advisable for the attainment of a free flow of thet stream of material to be heated and/or liquified, to arrange those of the humps 9' which are adjacent the inwardly flared entrance 11 of the vessel illustrated in Fig. 4 for example at an inclination to the longitudinal axis of the vessel, whereby the inclination preferably would be made to correspond to the conical inclination of the entrance 11.

As a further improvement of the arrangement according to the invention, the fins 6 or humps 9 may be provided with channels 10 for the accommodation of special heating elements or for the passage of a heating medium therethrough, or through suitable pipes arranged to extend through the said channels.

Figure 5:
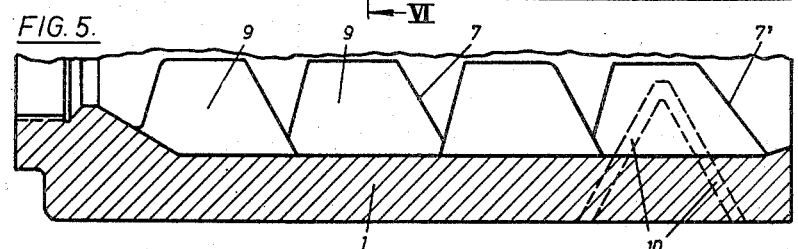
Fig. 5 is another longitudinal section through a vessel in accordance with line V—V of Fig. 4.
Figure 7:
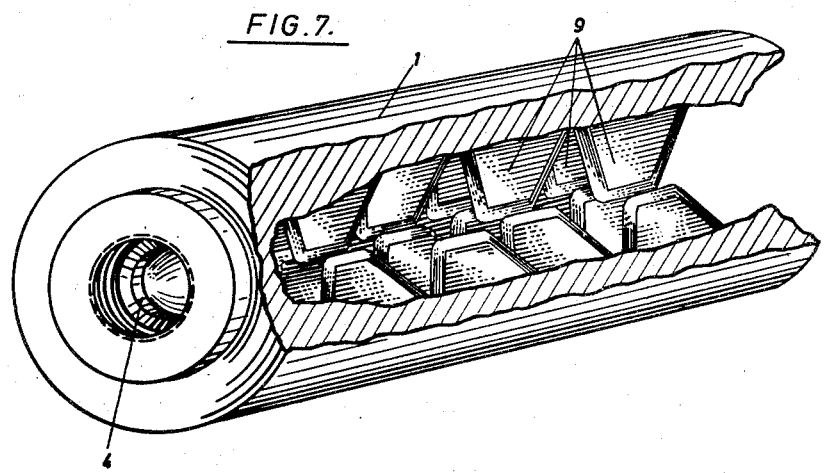
Fig. 7 shows a pressure vessel of the kind illustrated in Fig. 4 in perspective view with one of the side walls partly broken away.

For the better understanding of the example shown in Figs. 4 to 6 of the drawings, a pressure vessel of that kind has been illustrated in Fig. 7 in perspective view. One of the side walls of the device is shown broken away so as to show the various longitudinally and laterally displaced humps which extend from both the bottom part and the top part of the vessel toward the interior thereof.

The transmission of the heat can be further improved by making the pressure vessel of a non-ferrous metal of high specific heat conductivity.

In order to reduce the frictional resistance, the pressure vessel may be provided with an anti-corrosive coating, such as bronze, and may be nickle or chromium-plated internally. It is advisable to carry out such coating, or the corrosion-preventive treatment, particularly with pressure vessels consisting of non-ferrous metal in order to obtain a more durable surface of the same.

What I claim is:

1. In an apparatus for heating a poor heat-conducting material, such as natural and synthetic plastics, in a flowing condition under pressure, and comprising an elongated heating chamber with inlet and outlet means for the material at opposite ends of the chamber: a plurality of parallel chordal ribs projecting substantially to the center of the chamber from opposite walls thereof, the ribs extending in a longitudinal direction and the ribs projecting from one wall being laterally off-set in relation to the ribs projecting from the opposite wall, all of the ribs having longitudinally spaced recesses, the recesses in adjacent ribs being longitudinally off-set from each other, whereby the interior of the chamber is divided into a plurality of channels formed by laterally and longitudinally staggered protuberances projecting from the opposite walls of the heating chamber.

2. The apparatus of claim 1, wherein the recesses extend only into a part of the height of the ribs.

3. The apparatus of claim 1, wherein the recesses are as deep as the height of the ribs.

4. The apparatus of claim 1, wherein said protuberances are of different dimensions.

5. The apparatus of claim 1, wherein said inlet means comprises a frusto-conical extension connecting the inlet to said chamber, a plurality of said longitudinally extending ribs being provided in said extension at an inclination to the chamber axis in conformity with the inclination of the conical wall of the extension.

6. The apparatus of claim 1, wherein the sides of the protuberances facing the inlet means are inclined, the inclinations of the sides being closer to the inlet means being more gradual than those of the more distant protuberances.

7. The apparatus of claim 1, wherein the sides of the protuberances facing the inlet means are inclined, the inclination of the protuberances closest to the inlet means extending over substantially one third of the chamber.

8. The apparatus of claim 1, wherein said protuberances are provided with conduits for conducting heating medium therethrough.

9. The apparatus of claim 1, wherein said chambers are formed by a two-part cylindrical vessel, each part carrying one set of said parallel ribs.

References Cited in the file of this patent

UNITED STATES PATENTS

| 133,229 | Hyatt et al. | Nov. 19, 1872 |
| 2,057,945 | Gastrow | Oct. 20, 1936 |
| 2,280,022 | Banigan et al. | Apr. 14, 1942 |
| 2,669,750 | Keeney | Feb. 23, 1954 |

FOREIGN PATENTS

| 622,258 | Great Britain | Apr. 28, 1949 |